United States Patent [19]

Driftmyer

[11] Patent Number: 5,014,932
[45] Date of Patent: May 14, 1991

[54] WINDOW COOLING FOR HIGH SPEED FLIGHT

[75] Inventor: Richard T. Driftmyer, Bowie, Md.

[73] Assignee: The United States of America as represented by the Secretary of the Navy, Washington, D.C.

[21] Appl. No.: 517,011

[22] Filed: Apr. 27, 1990

[51] Int. Cl.$^5$ .................................... B64C 1/38
[52] U.S. Cl. .................. 244/117 A; 244/129.3; 244/1 R; 350/319; 350/584; 165/44; 165/169
[58] Field of Search ........... 244/1 R, 130, 207, 208, 244/117 A, 158 A, 137.1, 129.1, 129.3; 350/319, 584; 356/244; 165/41, 44, 169

[56] References Cited

U.S. PATENT DOCUMENTS

| | | | |
|---|---|---|---|
| 2,791,387 | 5/1957 | Weinberg | 244/137.1 |
| 2,850,005 | 9/1958 | Good et al. | 350/584 |
| 3,103,712 | 9/1963 | Allinikov et al. | 244/117 A |
| 3,116,613 | 1/1964 | Evelyn et al. | 244/117 A |
| 3,836,237 | 9/1974 | Egan et al. | 350/319 |
| 4,172,428 | 10/1979 | Pariset | 350/319 |
| 4,703,904 | 11/1987 | Haslund | 244/1 R |
| 4,858,850 | 8/1989 | McNay | 244/1 R |
| 4,863,118 | 9/1989 | Stallings et al. | 244/130 |
| 4,896,247 | 1/1990 | Cozel | 350/584 |

*Primary Examiner*—Galen Barefoot
*Attorney, Agent, or Firm*—Kenneth E. Walden; Jacob Shuster

[57] ABSTRACT

A buffering portion of boundary layer flow along a flight vehicle surface is diverted into an internal cavity at a downstream edge of a surface mounted window isolating recirculating flow of the diverted fluid through the cavity while it is cooled therewithin. Outflow of the cooled buffering fluid from at an upstream edge of the window is conducted into the buffering portion of the boundary layer flow to cool the window and prevent damage thereof by aerodynamically generated heating of the surface under high velocity flight conditions.

8 Claims, 1 Drawing Sheet

WINDOW COOLING FOR HIGH SPEED FLIGHT

BACKGROUND OF THE INVENTION

This invention relates generally to the cooling of windows placed on high speed flight vehicles.

Certain modifications of flight vehicle surfaces for aerodynamic drag reducing purposes have been proposed and tested, involving in common diversion of boundary layer flow into a surface cavity to establish a passive internal circulating flow for drag reduction purposes. One of such modifications includes the use of a porous cavity partition within a surface recess through which circulating flow is conducted to reduce surface drag by control of internal cavity flow. According to another of such surface modifications, a pivoted drag head mounted flush with the surface is utilized to control circulating flow within the cavity. An important discovery of the present invention resides in the use of certain diverse aspects of the foregoing surface drag reducing techniques to provide for windows cooling in a novel and unexpectedly beneficial manner.

It is therefore an important object of the present invention to provide a method and means for cooling windows in flight vehicle surfaces, otherwise subjected to aerodynamic heating damage, in a less expensive manner and without excessive addition of burdensome weight to the flight vehicle.

SUMMARY OF THE INVENTION

In accordance with the present invention, an internally depressurized cavity is formed within a flight vehicle underlying a surface thereof subjected to aerodynamic heating under high velocity flight, such cavity being closed by a window to be cooled. The portion of the surface peripherally framing the the window is ported to induce a circulating flow of fluid externally along the window in the direction of the boundary layer flow of air along the flight vehicle surface during high speed travel. The internal portion of the circulating flow occurs within the cavity in the opposite or reversed flow direction. Toward that end, the porting includes a downstream slot passage through which a buffering portion of the boundary layer air is diverted into the cavity under ram air pressure and an upstream outflow passage through which internally cooled fluid exits into the boundary layer for mixing therewith. The fluid diverted internally into the cavity is accordingly directed along a flow path isolated by the window from the external boundary layer for cooling by heat exchange within a cavity mounted heat sink device. The mixture of a buffering fluid formed by a portion of the boundary layer and coolant in a recirculative flow path absorbs heat from the windows for cooling thereof below a destructive temperature level.

BRIEF DESCRIPTION OF THE DRAWING FIGURES

Other objects advantages and novel features of the invention will become apparent from the following detailed description of the invention when considered in conjuction with the accompanying drawings wherein.

DETAILED DESCRIPTION OF THE PREFERRED EMBODIMENT

Figure 1:
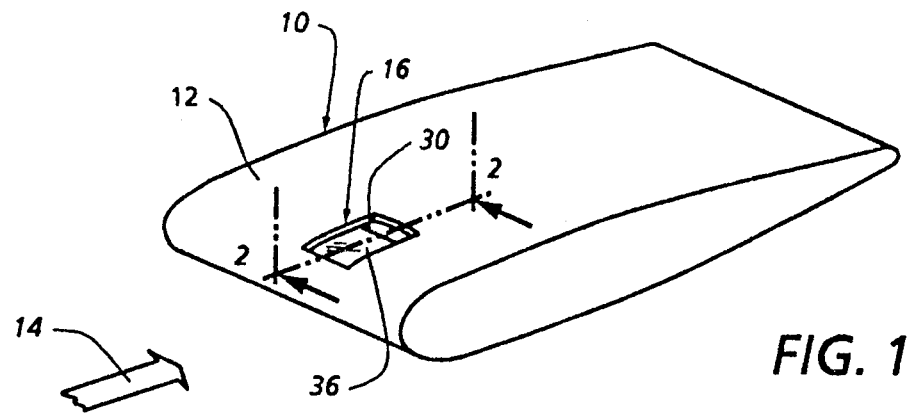
FIG. 1 is perspective view of a flight vehicle surface component having a recessed window portion.

Referring now to the drawing in detail, FIG. 1 illustrates, by way of example only, an aerodynamic component 10 of some high speed flight vehicle having a relatively rigid surface 12 along which air flows in a direction generally indicated by arrow 14. The aerodynamic surface 12 has a window portion generally referred to by reference numeral 16 through which radiation is received or emitted for various reasons often associated with a vehicle carried detection system, for example. Under supersonic flight conditions, the high speed flow of air in contact with the surface 12 generates intense heat. The material of the window portion 16 is ordinarily unable to tolerate such heat without damage unless adequate cooling is provided.

Figure 2:
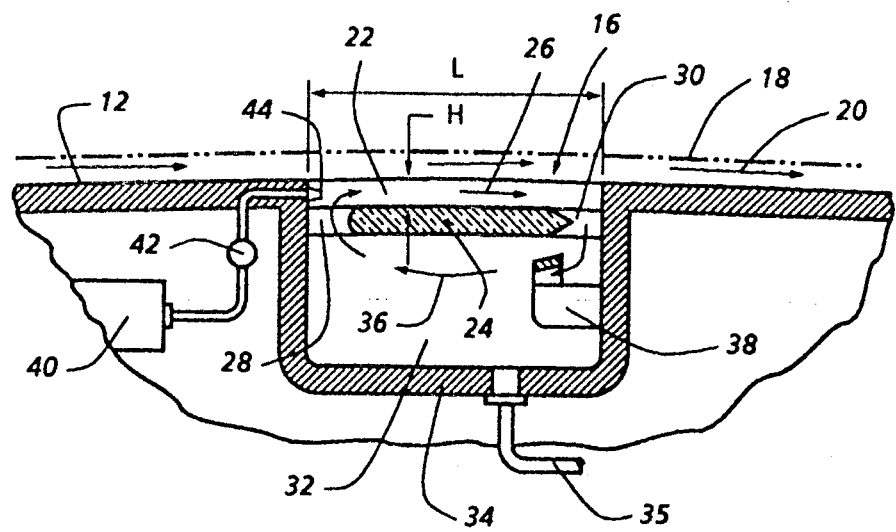
FIG. 2 is an enlarged partial section view taken substantially through a plane indicated by section line 2—2 in FIG. 1, showing the recessed window portion construction in accordance with one embodiment of the invention.
Figure 3:
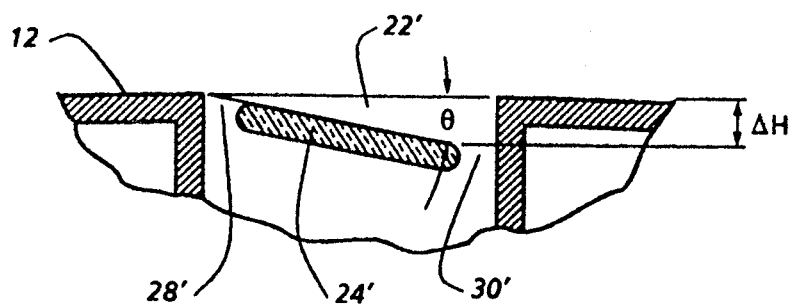
FIG. 3 is a partial section view showing certain modifications of the arrangement shown in FIG. 2.

As shown in FIG. 2, during flight of the vehicle a boundary layer of air 18 forms along the surface 12 traveling relative thereto in the direction of arrows 20. Along the window portion 16 of the surface 12, a cooling zone 22 is formed above a window 24 which requires adequate cooling under the high speed flight conditions. Cooling of the exposed surface of window 24 is accordingly effected in accordance with the present invention for a distance (L) along the cooling zone 22 in the flow direction of the boundary layer 18, the cooling zone having a depth (H) in the example shown.

The cooling zone to which the window 24 is exposed, as shown in FIG. 2, forms a portion of the boundary layer 18 within which a buffering/cooling action occurs. Such buffering portion of the boundary layer 18 is rendered heat absorbent for cooling purpose by mixing with cooled buffering fluid undergoing flow denoted by arrow 26 in the direction of the boundary layer flow. Such circulating flow includes inflow of the buffering fluid into the cooling zone 22 through a slot passage 28 at an upstream edge of the window 24 and outflow of the bufffering fluid from cooling zone 22 through a slot passage 30 at a downstream edge of the window relative to the direction of the boundary layer flow.

The downstream passage 30 diverts a regulated, ram pressure induced inflow of fluid from the cooling zone 22 of the boundary layer into a cavity chamber 32 formed in the surface 12 and enclosed by housing 34 in underlying relation to the window portion 16. The cavity chamber 32 is depressurized by connection of housing 34 to a source of vacuum through conduit 35. The portion of the boundary layer within cooling zone 22 inwardly diverted through downstream slot passage 30 is thereby isolated from the external boundary layer 18 by the window 24 as it travels along a recirculating flow path in a reversed direction as indicated by arrow 36 in FIG. 2. The circulating flow of fluid through chamber 32 along internally isolated path 36 exits through the upstream slot passage 28 into the cooling zone 22 at the upstream end of window 24 for mixing with the boundary layer 18 during external buffering flow along the heat absorbing flow path 26. The fluid diverted internally for recirculation along the isolated flow path 36 has its absorbed heat extracted by a suitable heat sink device 38 within the cavity chamber 32 as shown. The rate of cooling required to maintain the window 24 within allowable temperature limits under given flight conditions will be dependent upon the selection of an optimum depth distance (H) for the cooling zone 22.

With continued reference to FIG. 2, the buffering fluid being recirculated is supplied with a quanity of a coolant gas from a source 40 to form a buffering mixture with the boundary layer portion 22 as shown for protective coating of the window 24 and to enhance cooling. The source 40 is connected through some control valve 42 to a coolant injection device 44. The coolant injector 44 may be suitably located relative to the recirculating flow path, such as the upstream end of the window 24 as shown in FIG. 2. A minimized inflow quanity of coolant from injector 44 may be controlled through valve 42 to maintain a given window temperature.

FIG. depicts a variation in the geometry of the window portion in the surface 12, in which a window 24' is disposed at some angle $\theta$ to the surface 12 relative to the slot passage 28' at its upstream end to establish the cooling zone 22' having a varying depth with a maximum value $\Delta H$ at the downstream end of the window at which slot passage 30' is formed. The shape of the slot passages 28' and 30', as well as the parameters of the cooling zone 22' determined by $\theta$ and $\Delta H$ thus constitute variables through which an optimum arrangement may be designed in accordance with the present invention for minimizing the cooling necessary to maintain window temperature within allowed limits. Although the parameters $\theta$ and $\Delta H$ under certain conditions may be made equal to zero, it is contemplated that such dimensional parameters would be greater than zero where there is subsonic flow through the slot passages 28' and 30'.

It will apparent from the foregoing that the interplay of the boundary layer 18, the circulating flow of air diverted therefrom and the other parameters aforementioned will determine the window shielding and cooling effectiveness of the described arrangement.

Numerous modifications and variations of the present invention are possible in light of the foregoing teachings. It is therefore to be understood that within the scope of the appended claims in the invention may be practiced otherwise than as specifically described.

What is claimed is:

1. In combination with an surface exposed to a boundary layer of fluid during travel therethrough at high velocites, a system for cooling a window in the surface during said travel thereof, comprising means mounting the window within a portion of said surface for exposure to the boundary layer, cavity means connected to the surface for establishing a flow path isolated by the window from the boundary layer, flow controlling port means in said window mounting portion of the surface for establishing recirculated flow of the fluid between a buffering portion of said boundary layer along the window and the isolated flow path and heat sink means for extracting heat from the fluid during said recirculated flow thereof along the isolated low path to cool the window by heat exchange with the fluid within the buffering portion of the boundary layer.

2. The system of claim 1 wherein said window mounting portion of the surface is recessed.

3. The system of claim 2 wherein said flow controlling port means includes slot passages downstream and upstream of the window through which the fluid is diverted under ram pressure from the buffering portion of the boundary layer to the isolated flow path.

4. The system of claim 1 wherein said flow controlling port means include slot passages downstream and upstream of the window through which the fluid is diverted under ram pressure from the buffering portion of the boundary layer to the isolated flow path.

5. In combination with an surface exposed to a boundary layer of fluid during travel therethrough at high velocities, a system for cooling a window in the surface during said travel thereof, comprising means forming a cooling zone within the boundary layer to which the window is exposed, means mounted in underlying relation to the window for establishing a flow path isolated by the window from the boundary layer, flow controlling port means in the surface for recirculating flow of the fluid between said cooling zone and the isolated flow path and means for extracting heat from the fluid during said recirculated flow thereof along the isolated flow path to cool the window by heat exchange within the cooling zone.

6. The system of claim 5 wherein said flow controlling port means includes passage means in the surface for regulating inflow and outflow of the fluid with respect to said isolated flow path.

7. In combination with a flight vehicle surface having an internal cavity formed therein through which boundary layer air is diverted from the surface, a method of cooling a window mounted in said surface, including the steps of: fixedly positioning the window within the surface overlying said internal cavity; restrictively limiting said diversion of the boundary layer air relative to the internal cavity at location upstream and downstream of the window in the direction of flow of said boundary layer; and cooling the diverted air during flow through the internal cavity isolated from the surface, whereby the cooled air mixes with the boundary layer air externally of the surface in response to outflow thereof from the internal cavity to cool the window.

8. The method of claim 7 including the step of: injecting coolant into the diverted air to form a buffering fluid mixture therewith to protectively coat the window and enhance said cooling of the diverted air.

* * * * *